Nov. 20, 1928.
J. G. FURLAN
1,692,497
METHOD OF MAKING LOCK NUTS
Original Filed May 1, 1923
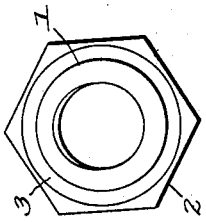
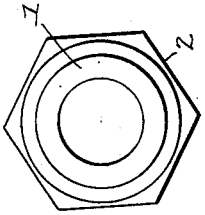
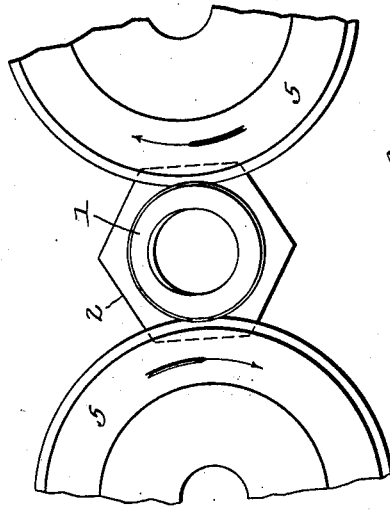
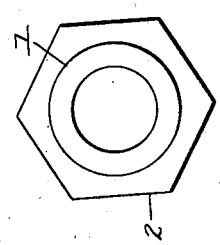
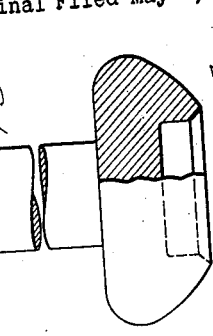
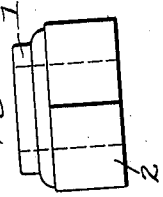
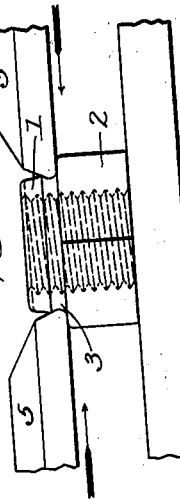
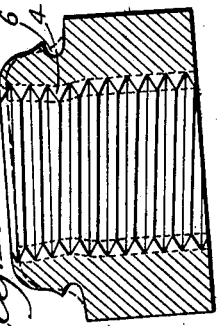
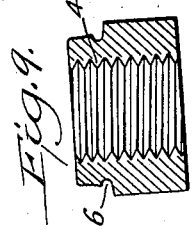
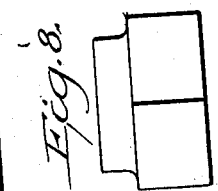
WITNESSES
Oliver W. Holmes
INVENTOR
John Guy Furlan
BY Knight Bros.
ATTORNEYS Patented Nov. 20, 1928.

1,692,497

UNITED STATES PATENT OFFICE.

JOHN GUY FURLAN, OF NEW YORK, N. Y., ASSIGNOR TO FURLAN NUT MACHINERY CORPORATION, OF NEW YORK, N. Y., A CORPORATION OF NEW YORK.

METHOD OF MAKING LOCK NUTS.

Application filed May 1, 1923, Serial No. 635,880. Renewed April 16, 1928.

My invention relates to lock-nuts that are characterized by having two groups of threads displaced away from each other in an axial direction, so that the threads of one group will be slightly out of helical alignment with the threads of the other group, the result being to give to the nut the well known character of a lock-nut. My invention relates more specifically to a nut of this class, in which a blank provided with a reduced end portion is so stretched or expanded at the base of the reduced portion, as to produce the lock-nut character above described.

My invention involves a method of making such nuts, which comprises first forming a nut with a reduced portion, and then expanding the nut at the base of the reduced portion, to give to the nut the lock nut character.

In the accompanying drawings, I have illustrated various ways in which my invention may be carried out.

In said drawings:

Figure 1 represents a side elevation of a nut blank.

Figure 2 shows the same in plan view.

Figure 3 shows the nut blank after it has been swaged into the form of a lock nut.

Figure 3ª is a plan view of the swaged nut.

Figure 4 represents the swaging tool for accomplishing this.

Figure 5 shows another form of nut blank.

Figure 5ª shows the same in plan view.

Figure 6 shows the same nut being expanded into the lock-nut form.

Figure 7 shows in plan, the nut and forming dies shown in side elevation in Figure 6.

Figure 8 shows in side elevation, an alternative form of nut blank.

Figure 9 shows a section of the same changed into a lock-nut.

Figure 10 is a section on an enlarged scale of a lock nut showing the deformation that occurs in the process of making the same.

Nut blanks such as shown in Figures 1, 5 and 8, may be produced by drop forging, hot pressing, bulldozing or any of the well known processes for forming nuts.

The reduced portion 1 of such nuts forms an extension from the polygonal portion 2 and has commonly been used to make the well known crown nut. According to my invention, I use the reduced portion for an entirely distinct purpose. By bringing a swaging or cold rolling action to bear upon the base of the reduced portion next to the body portion, as shown at 3 in Figure 3 for swaging and Figure 6 for cold rolling, I effect an axial expansion of the nut, as for instance from the dotted line shown in Figure 10 to the full line, the result of which is to displace the threads within the reduced extension of the nut from the threads within the body part of the nut, so as to throw the two groups of threads slightly out of helical alignment, producing thereby a nut which will have the well known properties of a lock-nut. Owing to the strength of the body portion of the nut, most of the expansion of the metal takes place in an axial direction and this expansion is largely concentrated at the point where the swaging is done, so that one or more threads at this particular zone, as shown at 4 in Figure 10, have their angle slightly increased. At this particular zone, there is also a slight diminution in the diameter of the threads, as shown by the dotted contour lines in Figure 10. This diminution in diameter is not sufficient, however, to result in any undue strain or friction that might strip the threads when the nut is being applied or removed. The slightly stretched, intermediate thread leads gradually from one group of threads to the other, and the stretching should be of such an amount that the metal will be gradually weaved from the position of one group to the position of the other group as the nut is applied and removed, so that when the nut is so removed, the threads of both the nut and the bolt will be found to be uninjured.

When such a nut is applied to a bolt, one group of threads, that for instance in the polygonal or body portion of the nut, will crowd one way while the other group of threads, say in the rounded reduced portion of the nut, will crowd the other way, the friction thus engendered bringing about the well known effect of a lock-nut, namely, one that cannot be jarred loose, but can be only removed by a wrench.

In Figure 1, I have shown a rounded fillet on the forged blank at the base of a rounded reduced portion of the nut, namely, at that portion next to the polygonal part, and in Figure 3 I have shown this fillet stamped by a die such as shown in Figure 4, whereby it has been made to take the shape of a cone, resulting in an up-thrust of the rounded portion from the dotted line to the full line, as shown in Figure 3.

In Figures 5 and 8, I show other forms of blanks which, by the action of cold rolling disks 5 (see Figures 6 and 7) have rolled into them at the base of the reduced portion a groove 6, the metal displaced by the formation of the groove flowing outwardly, so as to produce the effect of stretching or expanding the nut at the zone of the groove.

While I have shown blanks with the reduced portion of the nut of a rounded shape, it will be understood that my invention may also be applied to blanks where the reduced portion is polygonal, the same as the body portion. By careful design of the shape of the fillet and accurate adjustment of the stroke of the die or of the approach of the rolling disks, it is possible to produce any desired amount of expansion, so that the degree of locking can be predetermined with great accuracy, thus giving uniform results, which is a feature of great importance in the art of making lock-nuts.

I claim:—

1. The method of making lock nuts which comprises the steps of forming one end of the nut of smaller diameter than the body of the nut, and then expanding said smaller end axially to displace the threads at one end of the nut out of helical alignment with the threads at the other end.

2. The method of making lock nuts which comprises the steps of forming a rounded portion at one end of the nut and then expanding said rounded portion axially, to displace the threads at one end of the nut out of helical alignment with the threads at the other end.

3. The method of making lock nuts which comprises the steps of forming a polygonal portion at one end of the nut and a rounded portion at the other end of the nut, and then expanding the said rounded portion next to the polygonal portion, to effect an axial extension of the rounded portion from the polygonal portion.

4. The method of making lock nuts which comprises the steps of forming a rounded portion at one end of the nut and then expanding said rounded portion by cold rolling the metal at the base of the said rounded portion, to effect an axial displacement of the threads of the rounded portion from the threads of the other portion of the nut.

JOHN GUY FURLAN.